L. W. PENNY.
GEAR SHIFTING MECHANISM.
APPLICATION FILED NOV. 1, 1917.

1,317,175.

Patented Sept. 30, 1919.
3 SHEETS—SHEET 1.

Inventor
Louis W. Penny

By Whittemore Hulbert & Whittemore
Attorneys

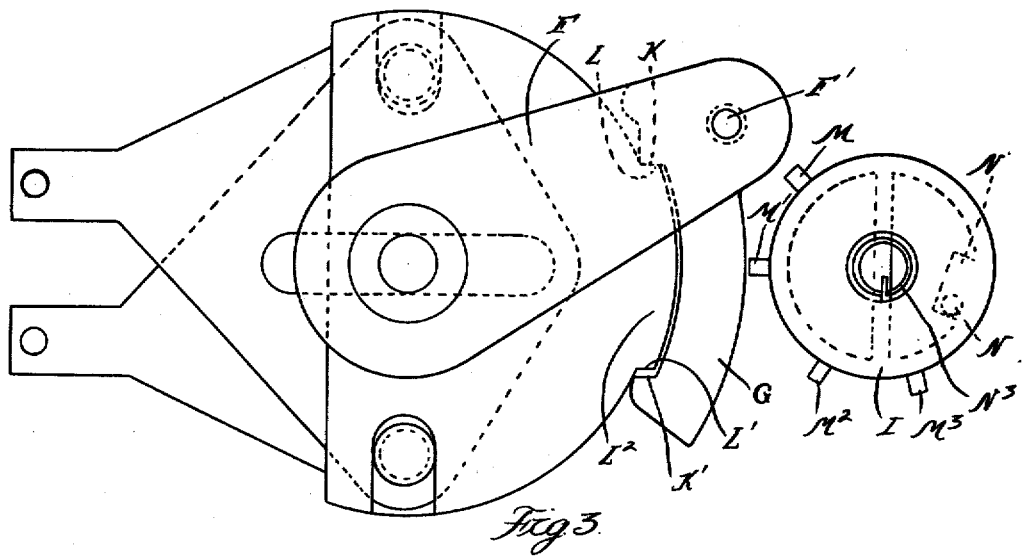
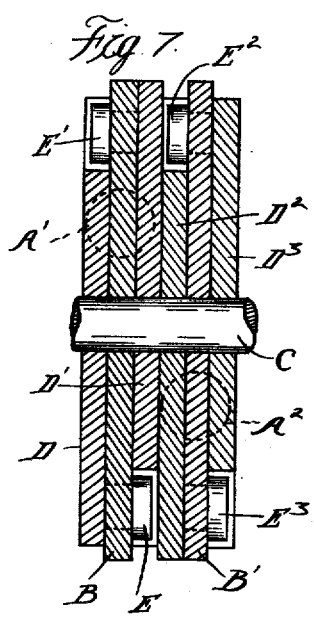
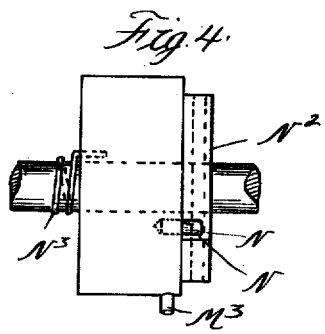

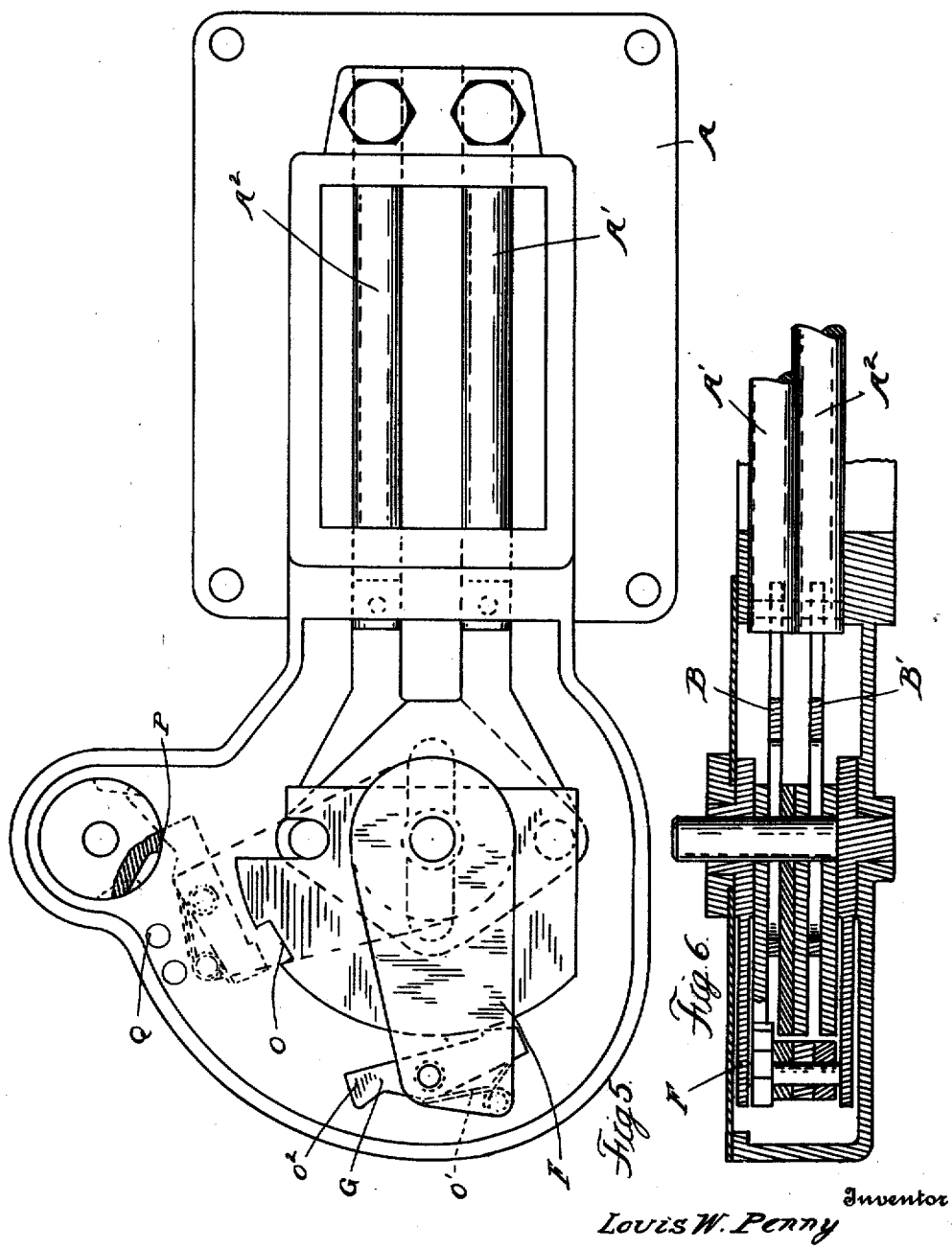

UNITED STATES PATENT OFFICE.

LOUIS W. PENNY, OF DETROIT, MICHIGAN, ASSIGNOR OF ONE-HALF TO HENRY C. PENNY, JR., OF DETROIT, MICHIGAN.

GEAR-SHIFTING MECHANISM.

1,317,175.   Specification of Letters Patent.   Patented Sept. 30, 1919.

Application filed November 1, 1917. Serial No. 199,782.

*To all whom it may concern:*

Be it known that LOUIS W. PENNY, a citizen of the United States of America, residing at Detroit, in the county of Wayne and State of Michigan, have invented certain new and useful Improvements in Gear-Shifting Mechanism, of which the following is a specification, reference being had therein to the accompanying drawings.

The invention relates to gear-shifting mechanism, and one of the objects of the invention is to obtain a simple and inexpensive construction of device by which gears are shifted through the medium of the clutch controlling pedal. Another object is to obtain a construction which may be applied to standard constructions of transmission gearing with but slight change therein. A further and very important object is to obtain a construction in which the mechanism for shifting gears is positively controlled; and further, to obtain various advantages hereinafter set forth.

In the drawings:

Fig. 3 is a view similar to Fig. 1 showing a modified construction;

Fig. 4 is an elevation of the selector shown in Fig. 4;

Fig. 5 is a view similar to Fig. 1, showing a modified construction;

Fig. 6 is a longitudinal section of Fig. 5; and

Fig. 7 is a transverse section thereof.

In the present state of the art it is usual in the construction of transmission gearings to provide two or more parallelly-arranged shifter rods, which are alternatively actuated to effect the shifting of the gears. It is also usual to form the gear case with a removable cover so as to provide access to the gears. My improved gear-shifting mechanism is preferably mounted as a unit upon a case which is the substitute cover of the gear case, and which when in position will operatively engage the gear shifting mechanism with the mechanism within the gear case.

Figure 1:
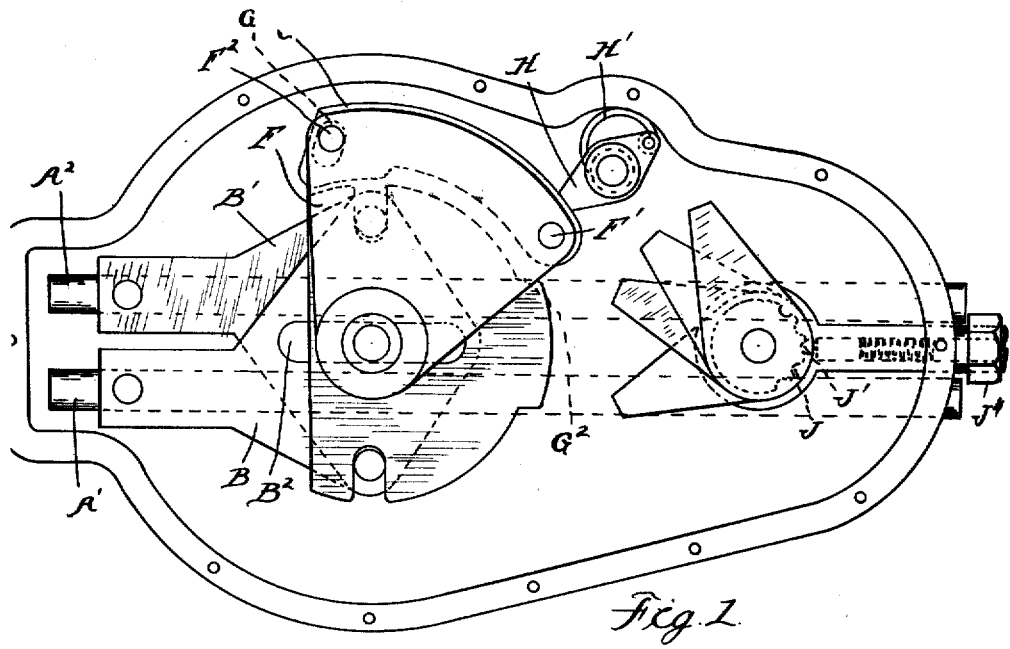
Figure 1 is a plan view of the mechanism, the cover of the case being removed.
Figure 2:
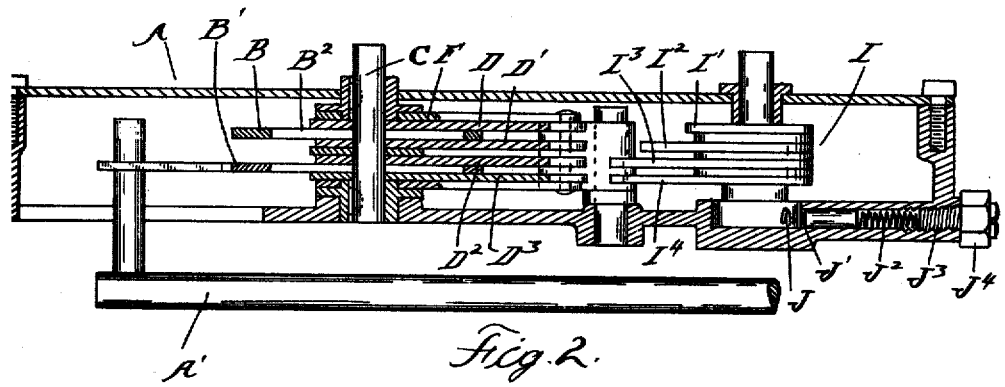
Fig. 2 is a longitudinal section thereof.

In detail the case A is the substitute cover of the gear case which houses the actuating and controlling mechanism for the parallel shifter rods A′ and A² which latter extend beneath the case. The actuating mechanism comprises a pair of heads B and B′ attached to the ends of the shifter rods A′ and A² respectively, and preferably in the form of flat and comparatively thin plates. These heads are centrally longitudinally slotted at B² for the passage of a shaft C mounted in suitable bearings in the case A. D, D′, D² and D³ are flat and comparatively thin segmental plates pivoted upon the shaft C and arranged in pairs upon opposite sides of the heads B and B′. E, E′, E² and E³ are pins or lugs projecting from the heads B and B′ from opposite sides thereof and upon opposite sides of the center of the shaft C. Each of these pins or lugs engages a bearing in one of the segments D, D′, D² and D³, and the arrangement is such as to form a coupling between said segments and the heads so that the rocking of any one of the segments will effect a corresponding movement of its coupled head. F is a rock arm keyed or otherwise secured upon the shaft C and preferably bifurcated to embrace the segmental plates D, D′, D² and D³ and the heads B and B′. F′ is a cross pin at the outer end of the rock arm F upon which are journaled a series of dogs G, there being one dog for each of the segmental plates D, D′, D² and D³. F² is a second cross pin at the outer end of the rock arm F, which cross pin passes through the elongated apertures G′ in the dogs G, whereby the latter are permitted a limited freedom of movement. Each dog is adapted to engage a shoulder G² in its corresponding segmental plate, and in the construction shown in Fig. 1 is normally pressed in engagement by the universal member H, which may rotate in a clockwise direction against the tension of the spring H′ but is held from rotation in the opposite direction beyond the position shown.

In one position of adjustment of the rock arm F the dogs G extend into operative relation with the selector I, which is preferably a rotary member having the projecting lugs I′, I², I³ and I⁴ for respectively engaging the dogs G in different positions of rotative adjustment to hold the dog engaged in engagement with its respective segment and shoulder G² on said segment, the arrangement being such that the selector engages the dog before the latter is disengaged from the universal member.

The selector I is provided with suitable means for yieldably maintaining the same in its different positions of adjustment. As shown, the selector I is provided with peripheral recesses J with which the ball J' is engageable, the latter being yieldably held in engagement by the coil spring J² abutting the screw lug J³ in the wall of the case A. The screw lug is adjustable to vary the tension upon the spring and is locked in position by the lock nut J⁴.

The rock arm F is connected through suitable linkage (not shown) to the operating pedal for the clutch, the rock arm having sufficient lost motion from its normal position to the position where the dogs G engage the shoulders G² to permit of the engagement and disengagement of the clutch with the engine fly-wheel by the pedal without affecting the transmission gearing.

With the construction as described the selector I is actuated by any suitable connection (not shown) which is under control of the operator, so that the device may be set for any predetermined gear shift. Normally, when the clutch is in engagement with the fly wheel, the parts are in the position shown in Fig. 1, and the initial operation of the pedal for disengaging the clutch will merely rock the arm F without bringing any of the dogs into engagement with the shoulders upon the segmental plates. If, however, the pedal is further actuated the arm F will be rocked to a point where one of the dogs G will engage the shoulder G² upon one of the segmental plates, and the dog being held in positive engagement therewith by the universal member H will upon continued rocking of the arm F return the segmental plate and its shifter rod to neutral position. At this point all the dogs are in engagement with the shoulders G² of all the segments. If the selector has been set for a predetermined gear shift, upon further rocking of the arm F in the same direction, one of the dogs G corresponding to the projecting lug upon the selector adjusted to operative position will be positively held in engagement with its respective segmental plate and will actuate said plate to shift the gear shifter attached thereto, the remaining dogs being free to ride over the shoulders G² of the other segments. At the completion of this movement the pedal controlling the clutch may be returned to engage the clutch with the fly wheel, the dogs riding over the peripheries of the segments and rocking the universal member H in so doing. The operation is the same in all positions of the selector, with the exception that a different dog is actuated in each position and the corresponding segment actuated thereby.

The construction is one in which the selector positively controls the shifting of the gear shifters to their adjusted positions and in which the universal member also positively controls the shifting of the gear shifters to their neutral positions. Furthermore, the construction is one which is exceedingly simple and inexpensive to manufacture, as the segmental plate G, G' G² and G³ and the heads B and B' may be formed from stampings, requiring no machine work.

In the modified construction shown in Figs. 3 and 4 the gear shifters are shifted to operative position by a movement of the rock arm in the opposite direction. The dogs G are provided with opposed shoulders K and K' for respectively engaging the shoulders L and L' of the projections L² upon the segmental plates D, D', D² and D³. The shoulder K is in such relation to the pin F' that it will always positively engage with the corresponding shoulder L, to return the segmental plate to its neutral position. The opposed shoulder K' will not, however, remain in engagement with the projection S excepting where it is held from disengagement. The selector I is provided with projecting lugs or pins M, M' M² and M³ for registering with the different dogs, and the arrangement is such that when any one of said lugs or pins is adjusted into the proper position it will hold the dog G against its segment and temporarily prevent disengagement of the shoulder K' from the shoulder L'. This will cause the rocking of the segment upon opposite movement of the rock arm F, which segment will be released when the end of the dog passes beyond its holding lug or pin M, M', M², or M³.

In the use of the above modified mechanism it may be at times that the segments D, D', D² and D³ will not be exactly positioned, and to avoid possibility of jamming of the mechanism due to this cause, the following provision has been made: The selector I instead of being positively keyed to its actuating shaft has a limited lost motion thereon, being provided with a pin N which engages a slot or recess N' in a collar N² fixed to the shaft. N³ is a spring sleeved upon the shaft and tensioned to normally hold the selector with the pin N at one end of the slot N'. This construction prevents the jamming of the parts, as the dog G if not in proper engagement with the projection L² will strike against the selector pin selected, turning the selector against the tension of the spring N³ until the dog slips into proper engagement, after which the resiliency of the spring returns the selector to a position where the selected pin again performs its function.

In the operation of this modified construction, the selector holds the selected dog in positive engagement until it has properly shifted the corresponding segmental plate, at which time the end of the dog slips off from the end of the selector lug or pin and prevents further movement. In the opposite movement of the dog the shoulder K positively engages and returns the segmental plate to neutral position.

In the modified construction shown by Figs. 5, 6 and 7, the shifter rods A' and A² are mounted in the case A and the actuating and controlling mechanism are housed in an extension of the case. Each dog G is adapted to engage a notch or shoulder O in its corresponding segmental plate and is normally pressed toward engagement by the tension of the spring O'. O² is a projection or tail piece on each dog, which in one position of adjustment of the rock arm F extends into operative relation with the selector I. This selector has the cam portions P for engaging the tail pieces O² of the different dogs in different positions of adjustment, so as to disengage all but one of the dogs from their corresponding notches O. The arrangement is such that by rocking the rock arm F any one of the dogs may be selected to operate, so that during the rocking of the arm F the selected dog will couple said rock arm to the corresponding segment, and by rocking the latter will cause the head B or B' to be actuated, which in turn adjusts the corresponding shifter rod A' or A². Q are trips for engaging the tail pieces O² of the dogs to uncouple said dogs after the desired movement has been imparted.

The operation of this modified construction is similar to that shown in Figs. 3 and 4 with the exception that the dogs are not positively forced into engagement with the segmental plates to either shift the shifter rods to neutral or operative positions. The springs upon the dogs yieldably force the dogs toward the segment while the selector disengages all the dogs with the exception of that desired to be kept in engagement and the trips disengage all the dogs to prevent further movement of the segments after the same have been shifted.

What I claim as my invention is:

1. A gear shifter comprising a shifter rod, a plurality of rockable members coupled with said rod to actuate the same, a plurality of dogs peripherally engageable with said rockable members, means for moving said dogs about the peripheries of said rockable members, and means for positively controlling the engagement of said dogs with said rockable members.

2. A gear shifter, comprising a shifter rod, a plurality of rockable members coupled with said rod to actuate the same, a rock arm, means carried by said rock arm engageable with the respective rockable members, and means for positively controlling the engagement of said means with said rockable members.

3. A gear shifter, comprising a shifter rod, a plurality of rockable members coupled with said rod to actuate the same, a rock arm, dogs carried by said rock arm engageable with the respective rockable members, and a selector engageable with said dogs to positively hold the same in engagement with their respective segments.

4. A gear shifter attachable as a unit to the transmission having a shifter rod, said gear shifter comprising a flat head connected to said shifter rod, a plurality of flat rockable members coupled with said head to actuate the same, a rock arm, means carried by said rock arm engageable with the respective rockable members, and a selector controlling said means to alternatively engage the same.

5. A gear shifter attachable as a unit to the transmission, comprising a casing adapted to form the cover plate of the transmission, a shifter rod mounted in said casing, a flat head connected to said shifter rod, a plurality of flat rockable segments coupled to said shifter rod to actuate the same in opposite directions by a rocking movement in the same direction, a plurality of dogs peripherally engageable with said segments, means for moving said dogs about the periphery of said segments, and a selector controlling the engagement of said dogs with said segments.

6. A gear shifter, comprising a shifter rod, a plurality of rockable members coupled with said rod to actuate the same, and a common means for engaging and actuating said rockable members to move said shifter rod to neutral and to operative positions while being moved in one direction.

7. A gear shifter, comprising a shifter rod, a plurality of rockable members coupled with said rod to actuate the same in opposite directions by a movement in the same direction, a common means engageable with and adapted to actuate said rockable members to move said shifter rod to neutral position and subsequently to operative position while said common means is moving in one direction, and positive control means for alternatively maintaining said common means in engagement with said rockable members while moving said shifter rod to operative position.

8. A gear shifter, comprising a shifter rod, a plurality of rockable members coupled with said rod to actuate the same, a plurality of dogs peripherally engageable with said rockable members, means for moving said dogs about the peripheries of said rockable members and means for controlling said dogs whereby during a portion of the movement of the dogs in one direction the gear shifter rod is moved to neutral position and during a subsequent portion of the movement of the dogs in the same direction, the shifter rod is moved to operative position.

9. A gear shifter, comprising a shifter rod, a plurality of rockable members coupled with said rod to actuate the same, a rock arm, dogs carried by said rock arm engageable with said rockable members to actuate the same, a pivoted member for positively retaining said dogs in engagement with said rockable members during a portion of the travel of the former, and a selector for alternatively retaining said dogs positively in engagement with their rockable members during a subsequent portion of the travel of the dogs.

10. A gear shifter, comprising a shifter rod, a plurality of rockable members coupled with said rod to actuate the same, said members having peripheral cam portions, a rock arm, dogs carried by said rock arm engageable peripherally with the respective rockable members and their cam portions, means for positively retaining said dogs in engagement with said rockable members and cam portions during a portion of the travel of the former to return the shifter rod to neutral position, and means for alternatively retaining said dogs positively in engagement with the rockable members and their cam portions during a subsequent portion of the travel of the dogs to move said shifter rod to operative position.

11. A gear shifter, comprising a shifter rod, a plurality of rockable members coupled with said rod to actuate the same, a rock arm, dogs carried by said rock arm engageable with the respective rockable members, an adjustable selector engageable with said dogs to alternatively hold the same in positive engagement with their respective rockable members, and a detent member for yieldably maintaining said selector in its adjusted position.

12. A gear shifter, comprising a shifter rod, a plurality of rockable members coupled with said rod to actuate the same, a rockable member, means carried by the last-mentioned rockable member for engaging the first-mentioned rockable members, and a selector for engaging said means to control the alternative engagement thereof with said first-mentioned rockable members.

13. A gear shifter, comprising a shifter rod, a plurality of rockable members coupled with said rod to actuate the same, a rock-arm, pivoted members carried by said rock-arm for engaging said rockable members, means for maintaining said pivoted members normally in engagement with said rockable members, and a selector for engaging said pivoted members to control the alternative engagement thereof with said rockable members.

14. A gear shifter, comprising a shifter rod, a plurality of rockable segments coupled with said rod to actuate the same, a rock-arm, dogs carried by said rock-arm respectively corresponding to said segments and engageable therewith, and a selector controlling said dogs to alternatively engage the same.

15. A gear shifter, comprising a shifter rod, a plurality of rockable segments coupled to said rod to respectively actuate the same in opposite directions, a rock-arm, dogs carried by said rock-arm for respectively engaging said segments, and a selector for engaging said dogs to control the engagement and disengagement of the same from said segments.

16. A gear shifter, comprising a plurality of shifter members, a plurality of rockable segments adjacent to each of said shifter members and coupled to actuate the same in different directions, a rock-arm, a plurality of dogs carried by said rock arm and respectively engageable with said segments to actuate the same, and a selector for engaging said dogs to control the alternative engagement of the same with their respective segments.

17. A gear shifter, comprising a shifter member, a plurality of rockable segments coupled to said shifter member to actuate the same in opposite directions by a rocking movement in the same direction, a rock-arm, a plurality of dogs carried by said rock-arm peripherally engageable with said segments, and a selector for engaging said dogs to control the alternative engagement or disengagement of the same from the respective segments.

18. A gear shifter, comprising a shifter rod having a flat head, a plurality of flat rockable members arranged parallel to and coupled with said flat head to actuate the same, a rock-arm, means carried by said rock-arm for engaging said flat rockable members, and a selector controlling said means to alternatively engage the same.

19. A gear shifter, comprising a shaft, a shifter member, a flat head connected to said shifter member, said head being slotted for the passage of said shaft, a plurality of flat rockable members arranged in parallelism, pivoted upon said shaft, said flat rockable members being coupled to said flat head eccentrically of said shaft, a rock-arm, means carried by said rock-arm for engaging said rockable members, and a selector for controlling said means to alternatively engage the same.

20. A gear shifter, comprising a plurality of parallelly movable shifter members, flat heads connected to said shifter members arranged in parallelism, a plurality of flat rockable members for each of said shifter members arranged parallel thereto, said rockable members being pivoted centrally to said heads and the members for each shifter member being coupled to the respective heads eccentrically on opposite sides of the pivot, a rock-arm, means carried by said rock-arm for engaging said rockable members, and a selector for controlling the alternative engagement of said means with said rockable members.

21. In a gear shifter, the combination with a plurality of shifter rods, of flat heads attached to said shifter rods arranged parallel to each other, a plurality of rockable segments arranged in pairs upon opposite sides of said flat heads, the members of said pairs being coupled to the intermediate head on opposite sides of the axis of the segment, a rock-arm, a plurality of dogs carried by said rock-arm and individually engageable with the respective segments, and a selector for engaging said dogs to control the alternative engagement thereof with said segments.

22. In a gear shifter, the combination with a plurality of shifter members, of flat heads connected to said shifters and arranged parallel to each other, a plurality of flat segments pivoted centrally of said heads and arranged in pairs on opposite sides thereof, eccentric couplings between said segments and said heads upon opposite sides of the axis, a rock-arm, a plurality of dogs carried by said rock-arm and individually engageable with the respective segments, and a selector for engaging said dogs to control the alternative engagement thereof with said segments.

23. A gear shifter, comprising a plurality of parallelly movable shifter members, flat heads connected to said shifter members arranged in parallelism, flat segments arranged in pairs upon opposite sides of said flat heads, said segments being pivoted centrally of said heads and the members of said pairs being coupled to said heads eccentrically on opposite sides of the pivot, a rock-arm, a plurality of dogs carried by said rock-arm adapted to individually engage the respective segments, and a selector for engaging said dogs to control the alternative engagement thereof with said segments.

24. In a gear shifter, the combination with a plurality of parallelly-movable shifter rods, of sheet metal stamped heads secured to said rods and arranged in parallelism with each other, a plurality of stamped sheet metal segments arranged in pairs upon opposite sides of said stamped heads and having a common axis or pivot arranged centrally of said heads, eccentric couplings between the members of said pairs of segments and the intermediate head upon opposite sides of the axis of the segment, a rock-arm, a plurality of dogs carried by said rock-arm and engageable individually with the respective segments, and a selector for engaging said dogs to control the alternative engagement thereof with said segments.

25. A gear shifter, comprising a casing adapted to form the cover plate of the transmission, shifter rods mounted in said casing and parallelly movable therein, a lateral extension of said casing, flat heads for said shifter rods arranged in parallelism within said lateral extension of the casing, a plurality of pairs of flat rockable segments arranged upon opposite sides of said flat heads and eccentrically coupled therewith upon opposite sides of the axis thereof, a rock-arm, a plurality of dogs carried by said rock-arm and individually engageable peripherally with the respective segments, and a rotary selector having cam portions for engaging said dogs to control the alternative engagement of the same with their respective segments.

26. A gear shifter, comprising a shifter rod, a plurality of rockable members coupled with said rod to actuate the same, a plurality of dogs peripherally engageable with said rockable members, means for moving said dogs about the peripheries of said rockable members, means common to all of said dogs for holding the same in engagement with the rockable members during a portion of the movement of the dogs, and means for alternatively holding said dogs in engagement with the rockable members during another portion of travel of the dogs.

27. A gear shifter, comprising a shifter rod, a plurality of rockable members coupled with said rod to actuate the same, a plurality of dogs peripherally engageable with said rockable members, means for moving said dogs about the peripheries of said rockable members, a universal member for engaging all of said dogs to hold the same in engagement with the rockable members during a portion of the travel of said dogs, and a selector for individually engaging said dogs to hold the same in engagement with the rockable members during another portion of the travel of said dogs.

In testimony whereof I affix my signature.

LOUIS W. PENNY.

Copies of this patent may be obtained for five cents each, by addressing the "Commissioner of Patents, Washington, D. C."